US011240669B2

(12) United States Patent
Chien et al.

(10) Patent No.: US 11,240,669 B2
(45) Date of Patent: Feb. 1, 2022

(54) WIRELESS MOUSE AND DATA TRANSMISSION METHOD THEREOF

(71) Applicant: Primax Electronics Ltd., Taipei (TW)

(72) Inventors: Chih-Feng Chien, Taipei (TW); Chin-An Lin, Taipei (TW); Yun-Jung Lin, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 348 days.

(21) Appl. No.: 16/448,430

(22) Filed: Jun. 21, 2019

(65) Prior Publication Data

US 2020/0296579 A1  Sep. 17, 2020

(30) Foreign Application Priority Data

Mar. 15, 2019 (TW) ................... 108108945

(51) Int. Cl.
*H04W 12/50* (2021.01)
*H04L 9/32* (2006.01)
*H03M 13/09* (2006.01)

(52) U.S. Cl.
CPC .......... *H04W 12/50* (2021.01); *H03M 13/09* (2013.01); *H04L 9/3273* (2013.01); *H04L 2209/80* (2013.01)

(58) Field of Classification Search
CPC ..... H04W 12/50; H03M 13/09; H04L 9/3273; H04L 2209/80
USPC ........................................................ 380/27
See application file for complete search history.

(56) References Cited

U.S. PATENT DOCUMENTS

| | | | |
|---|---|---|---|
| 6,731,536 B1 * | 5/2004 | McClain | G11C 7/24 365/185.04 |
| 7,224,801 B2 * | 5/2007 | Abdo | G06F 21/85 380/255 |
| 2003/0039356 A1 * | 2/2003 | Kurashima | H04K 1/00 380/42 |
| 2005/0235159 A1 * | 10/2005 | Anandakumar | G06F 3/03543 713/185 |
| 2007/0132733 A1 * | 6/2007 | Ram | G06F 3/03544 345/163 |
| 2007/0198436 A1 * | 8/2007 | Weiss | G06Q 10/10 705/75 |

\* cited by examiner

*Primary Examiner* — Abiy Getachew
*Assistant Examiner* — Mohammad S Shams
(74) *Attorney, Agent, or Firm* — Kirton McConkie; Evan R. Witt (57) ABSTRACT

A wireless mouse includes a mouse body and a wireless receiver. The wireless receiver is connected with a computer host. When the mouse body is operated by a user, an original information is generated. The original information is encrypted and converted into an encryption information by the mouse body. The wireless receiver receives the encryption information from the mouse body. After the encryption information is received by the wireless receiver, the encryption information is decrypted by the wireless receiver. Consequently, the encryption information is restored into the original information. After the computer host receives the original information through the wireless receiver, the computer host performs a corresponding operation.

8 Claims, 9 Drawing Sheets

WIRELESS MOUSE AND DATA TRANSMISSION METHOD THEREOF

FIELD OF THE INVENTION

The present invention relates to a wireless transmission technology, and more particularly to a wireless mouse and a data transmission method for the wireless mouse.

BACKGROUND OF THE INVENTION

Generally, the widely-used peripheral input device of a computer system includes for example a mouse device, a keyboard device, a trackball device, or the like. When a mouse device is held by a user's palm, the user may move the mouse device to control movement of the cursor shown on the computer screen. In addition, the user may click and select a desired icon shown on the computer screen or execute a corresponding function. As a consequence, most users and most manufacturers of the input devices pay much attention to the mouse device. Moreover, mouse devices are classified into wired mouse devices and wireless mouse devices. In comparison with the wired mouse devices, the uses of the wireless mouse devices can reduce the cost of cables (or connecting wires). Moreover, the uses of the wireless mouse devices can reduce the storage space and increase the operating distance. Recently, the wired mouse devices are gradually replaced by the wireless mouse devices.

Figure 1:
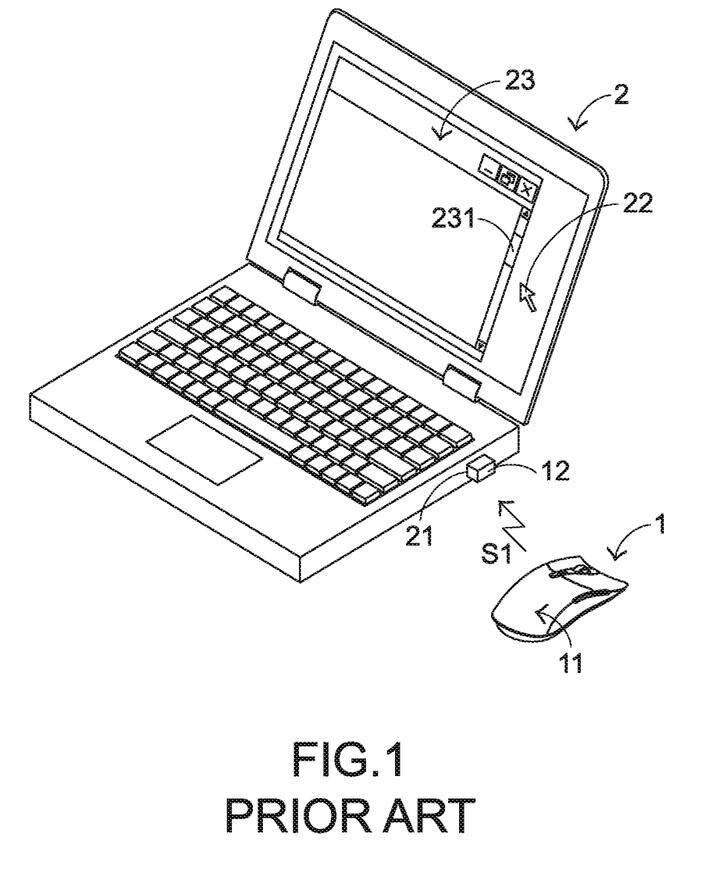
FIG. 1 schematically illustrates the communication between a conventional wireless mouse and a computer host.

FIG. 1 schematically illustrates the communication between a conventional wireless mouse and a computer host. The wireless mouse 1 comprises a mouse body 11 and a wireless receiver 12. When the mouse body 11 is held by a user's palm, the mouse body 11 can be moved, scrolled or clicked by the user. Moreover, according to the user's operation, a control signal S1 with a control information is generated. The wireless receiver 12 is plugged into a connecting port 21 of the computer host 2. The wireless receiver 12 receives the control signal S1 from the mouse body 11 in a wireless communication manner. Due to the wireless communication between the wireless receiver 12 and the mouse body 11, the computer host 2 acquires the control information from the mouse body 11. According to the control information, the computer host 2 performs the corresponding operation of moving a cursor 22, scrolling a window scrollbar 231, enlarging a graphic-based window 23, shrinking the graphic-based window 23 or closing the graphic-based window 23.

However, since the information exchange between the wireless mouse 1 and the computer host 2 is not securely protected, the use of the conventional wireless mouse 1 still has some drawbacks. For example, during the process of transmitting the control signal S1 from the wireless mouse 1 to the computer host 2, the control signal S1 is easily monitored and cracked by a person with bad intentions. After the control signal S1 is cracked, the control information contained in the control signal S1 will be acquired. Consequently, the computer host 2 is controlled and the important information is stolen.

Therefore, there is a need of providing an improved wireless mouse and an improved data transmission method for the wireless mouse.

SUMMARY OF THE INVENTION

The present invention relates to a wireless mouse. The wireless mouse includes a mouse body and a wireless receiver. Before the information is transmitted from the mouse body to the wireless receiver, the information is encrypted. When the mouse body and the wireless receiver are in communication with each other, the information is not monitored and cracked by a person with bad intentions. Consequently, the security of protecting the information between the mouse body and the wireless receiver is enhanced.

Another object of the present invention provides an information transmission method for the wireless mouse.

In accordance with an aspect of the present invention, a wireless mouse is provided. The wireless mouse includes a mouse body and a wireless receiver. When the mouse body is operated by a user, an original information is generated. The original information is encrypted and converted into an encryption information by the mouse body. The wireless receiver is connected with a computer host, and receives the encryption information from the mouse body. After the encryption information is received by the wireless receiver, the encryption information is decrypted by the wireless receiver. Consequently, the encryption information is restored into the original information. After the computer host receives the original information through the wireless receiver, the computer host performs a corresponding operation.

In accordance with another aspect of the present invention, a data transmission method for a wireless mouse is provided. The wireless mouse includes a mouse body and a wireless receiver. The mouse body is operable by a user. The wireless receiver is connected with a computer host. The data transmission method includes the following steps. In a step (a), a fixed password table is stored in the mouse body and the wireless receiver. In a step (b), a pairing identification code is generated during a process of pairing the mouse body with the wireless receiver. In a step (c), a random password table is generated according to the pairing identification code and the fixed password table. In a step (d), an original information is encrypted according to the fixed password table and the random password table. Consequently, the original information is converted into an encryption information. When the mouse body is operated by the user, the original information is generated. The encryption information contains the encrypted original information and a cyclic redundancy check code. In a step (e), the encryption information is received, and the encryption information is decrypted according to the fixed password table, the random password table and the cyclic redundancy check code. Consequently, the encryption information is restored to the original information.

The above objects and advantages of the present invention will become more readily apparent to those ordinarily skilled in the art after reviewing the following detailed description and accompanying drawings, in which:

DETAILED DESCRIPTION OF THE
PREFERRED EMBODIMENT

Figure 2:
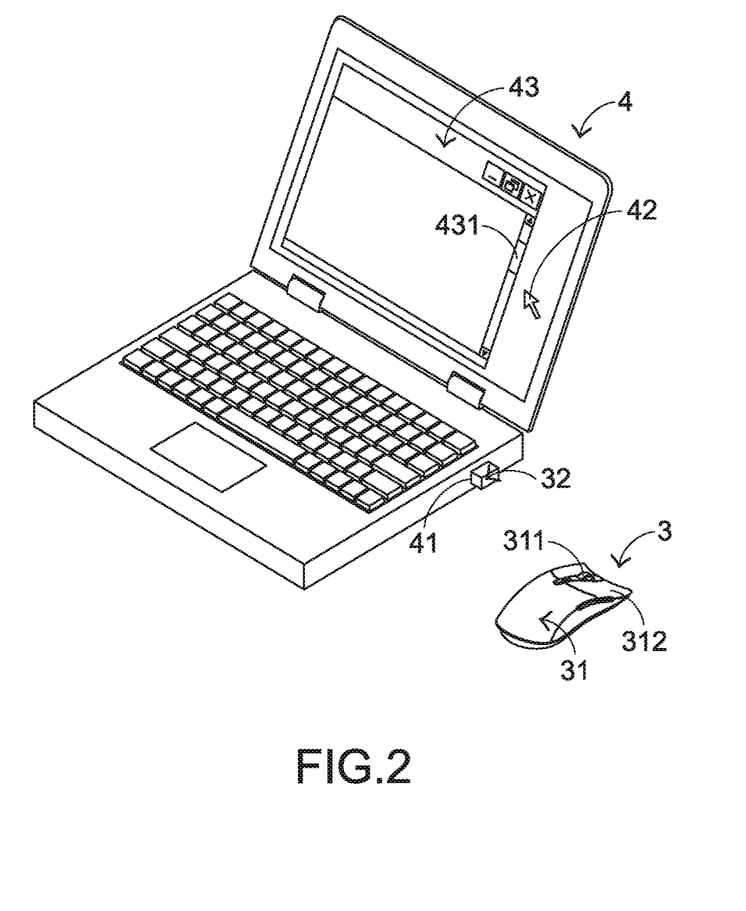
FIG. 2 schematically illustrates the communication between a wireless mouse and a computer host according to an embodiment of the present invention.

FIG. 2 schematically illustrates the communication between a wireless mouse and a computer host according to an embodiment of the present invention. The wireless mouse 3 comprises a mouse body 31 and a wireless receiver 32. When the mouse body 31 is held by the user's palm, the user may move the mouse body 31, rotate a scroll wheel 311 of the mouse body 31 or click a button 312 of the mouse body 31. The wireless receiver 32 is plugged into a connecting port 41 of the computer host 4. When the mouse body 31 is operated by the user, the mouse body 31 is in wireless communication with the wireless receiver 32 that is plugged into the computer host 4. Consequently, the computer host 4 performs the corresponding operation of moving a cursor 42, scrolling a window scrollbar 431, enlarging a graphic-based window 43, shrinking the graphic-based window 43 or closing the graphic-based window 43

An example of the computer host 4 includes but is not limited to a desktop computer, a notebook computer or a tablet computer. Alternatively, the computer host 4 is an electronic device with any software execution function or a programmable logic operation function. In an embodiment, the connecting port 41 of the computer host 4 is a universal serial bus (USB) connecting port. The wireless receiver 32 is a USB dongle that is plugged into the USB connecting port. The wireless receiver 32 is in communication with the mouse body 31 according to a 2.4G wireless radio frequency transmission technology. It is noted that the types of the computer host 4 and the connecting port 41, the type of the wireless receiver 32 and the communication protocol between the wireless receiver 32 and the mouse device 31 are not restricted.

FIGS. 3A-3F schematically illustrate the operations of the wireless mouse and the computer host as shown in FIG. 2.

Figure 3A:
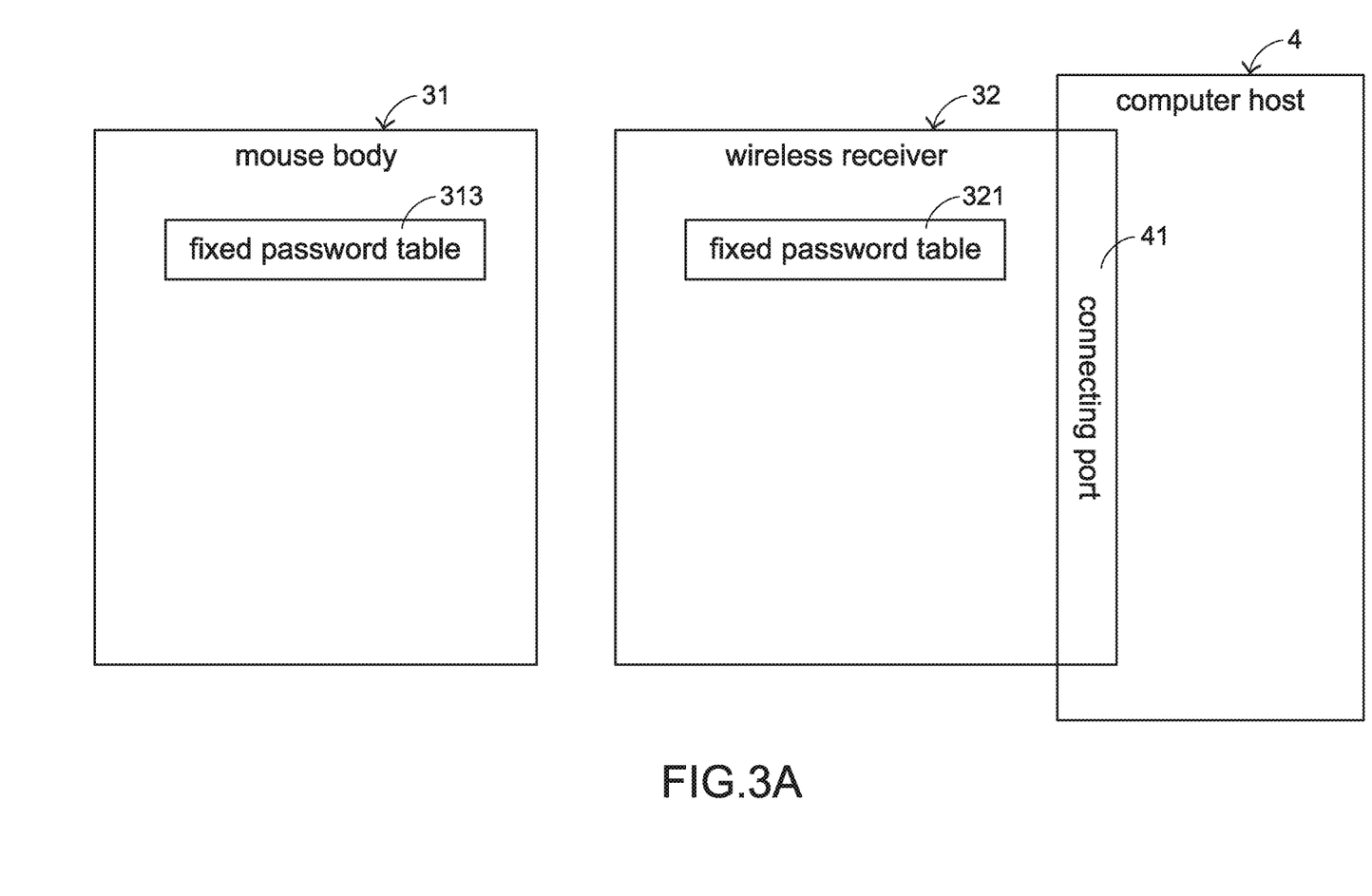
FIG. 3A schematically illustrate the operations of the wireless mouse and the computer host as shown in FIG. 2.
Figure 3B:
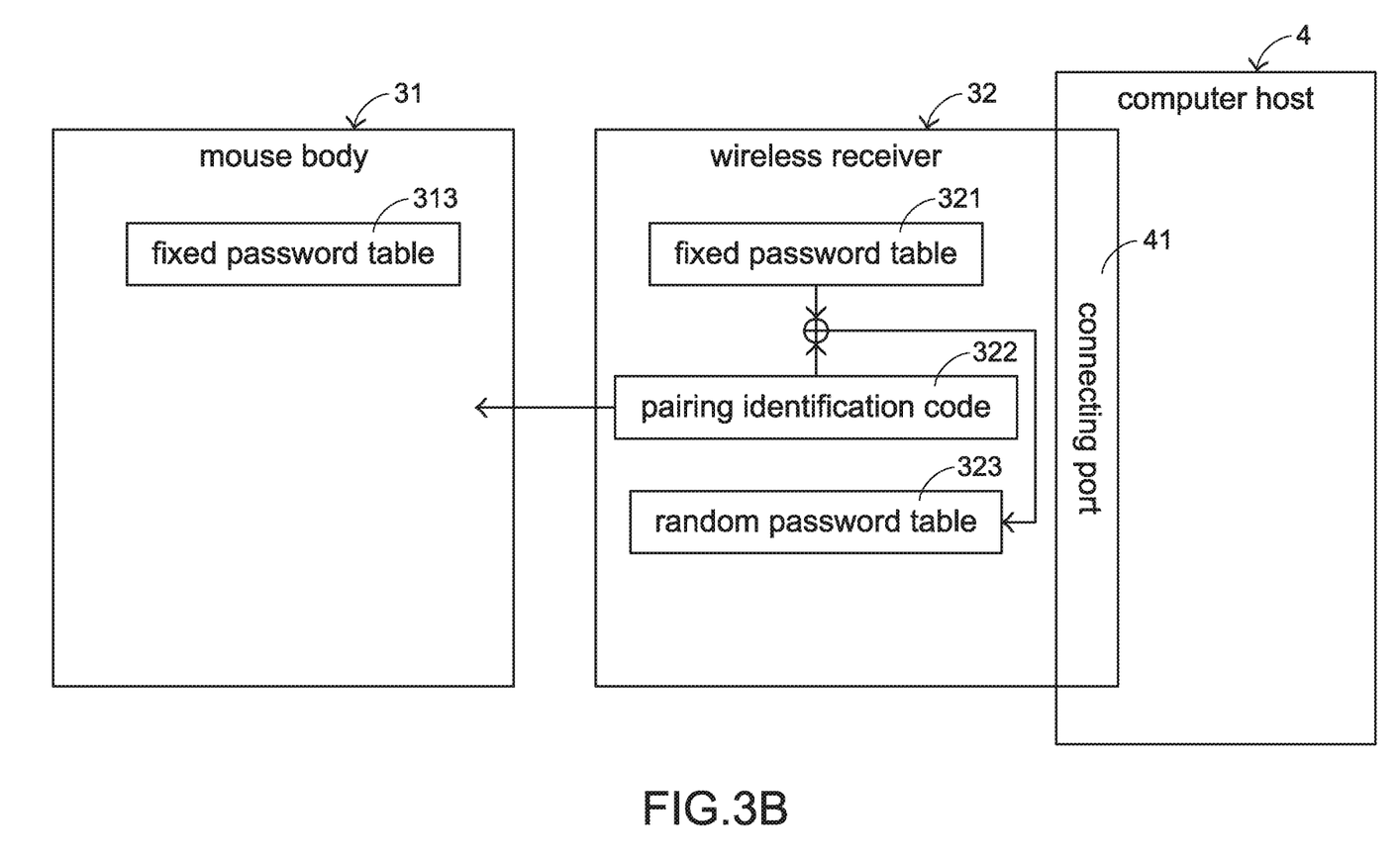
FIG. 3B schematically illustrate the operations of the wireless mouse and the computer host as shown in FIG. 2.

Firstly, please refer to FIG. 3A. The mouse device 31 of the wireless mouse 3 has a fixed password table 313, and the wireless receiver 32 has a fixed password table 321. The fixed password table 313 and the fixed password table 321 are identical. Preferably but not exclusively, the fixed password tables 313 and 321 haven stored in the mouse body 31 and the wireless receiver 32 before the mouse body 31 and the wireless receiver 32 leave the factory.

When the wireless mouse 3 is used for the first time, it is necessary to pair the mouse body 31 with the wireless receiver 32 to control the wireless communication of the computer host 4. Please refer to FIG. 3B. During the process of pairing the mouse body 31 with the wireless receiver 32, the wireless receiver 32 issues a pairing identification code 322 to the mouse body 31. Moreover, the wireless receiver 32 generates a random password table 323 according to the generated pairing identification code 322 and the fixed password table 321 in the wireless receiver 32. The method for pairing the mouse body 31 with the wireless receiver 32 is well known to those skilled in the art, and is not redundantly described herein.

Figure 3C:
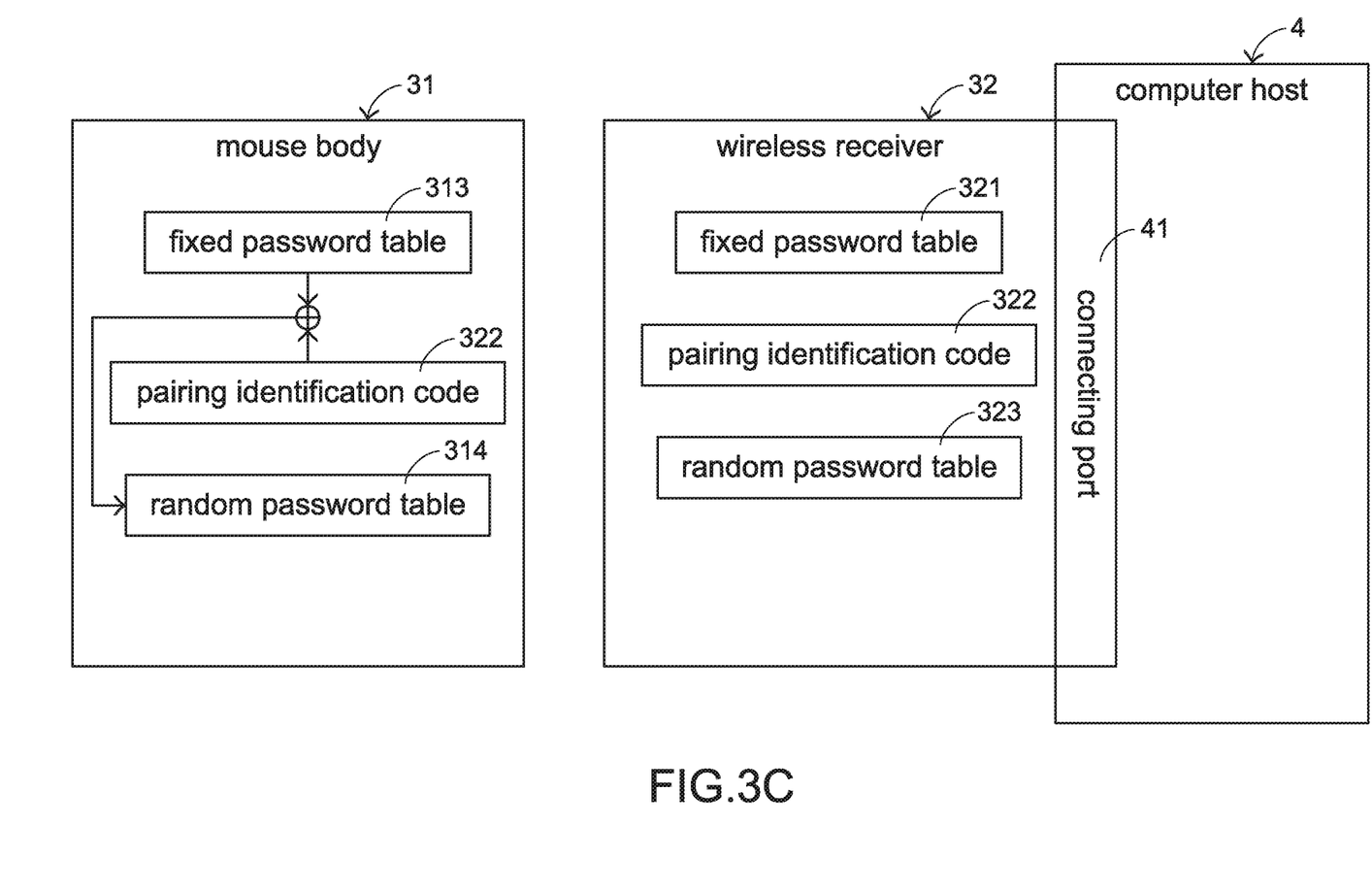
FIG. 3C schematically illustrate the operations of the wireless mouse and the computer host as shown in FIG. 2.

Please refer to FIG. 3C. After the mouse body 31 receives the pairing identification code 322 from the wireless receiver 32, the mouse body 31 generates a random password table 314 according to the pairing identification code 322 and the fixed password table 313 in the mouse body 31. The random password table 314 generated by the mouse body 31 and the random password table 323 generated by the wireless receiver 32 are identical.

Figure 3D:
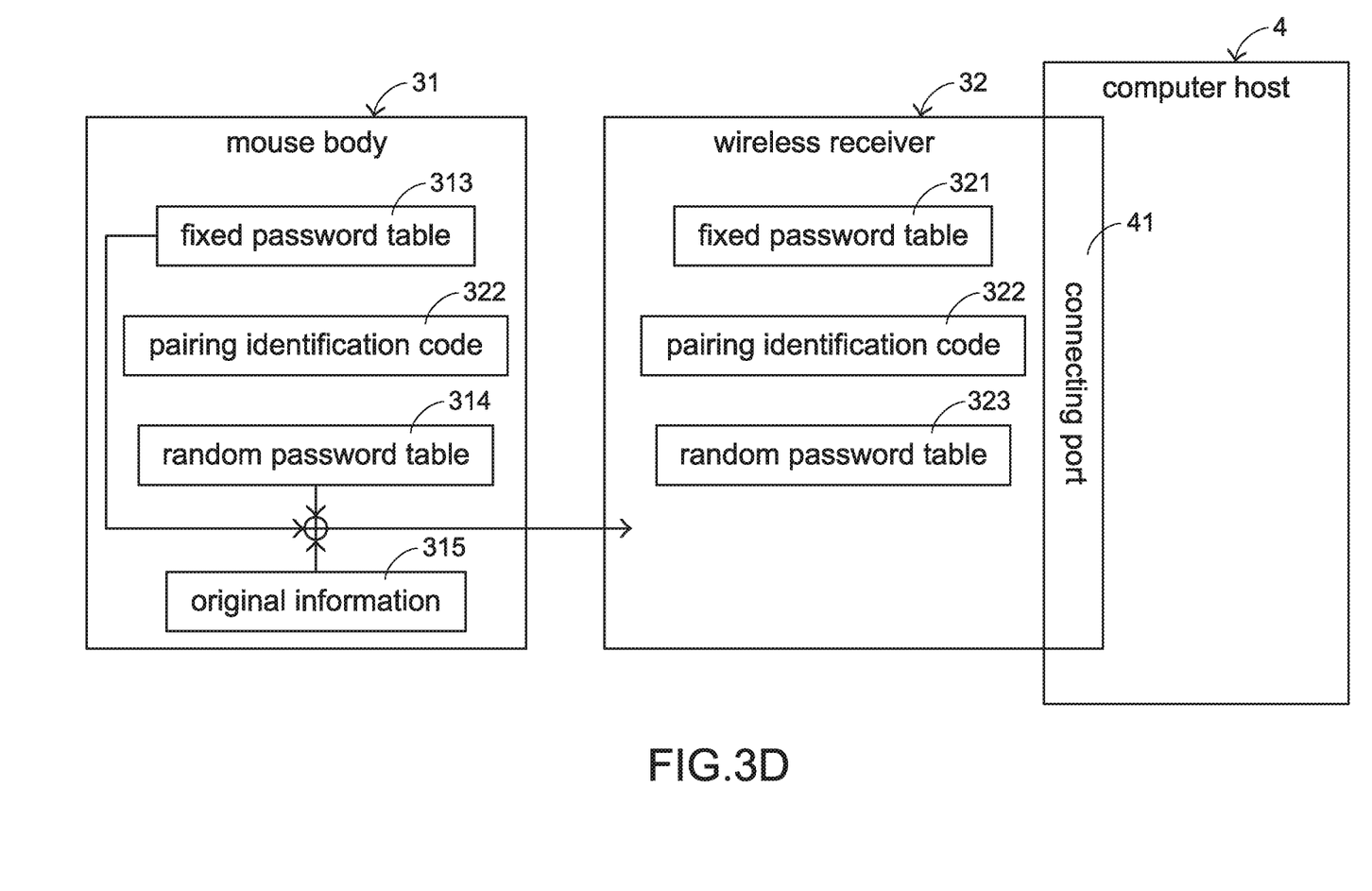
FIG. 3D schematically illustrate the operations of the wireless mouse and the computer host as shown in FIG. 2.
Figure 3E:
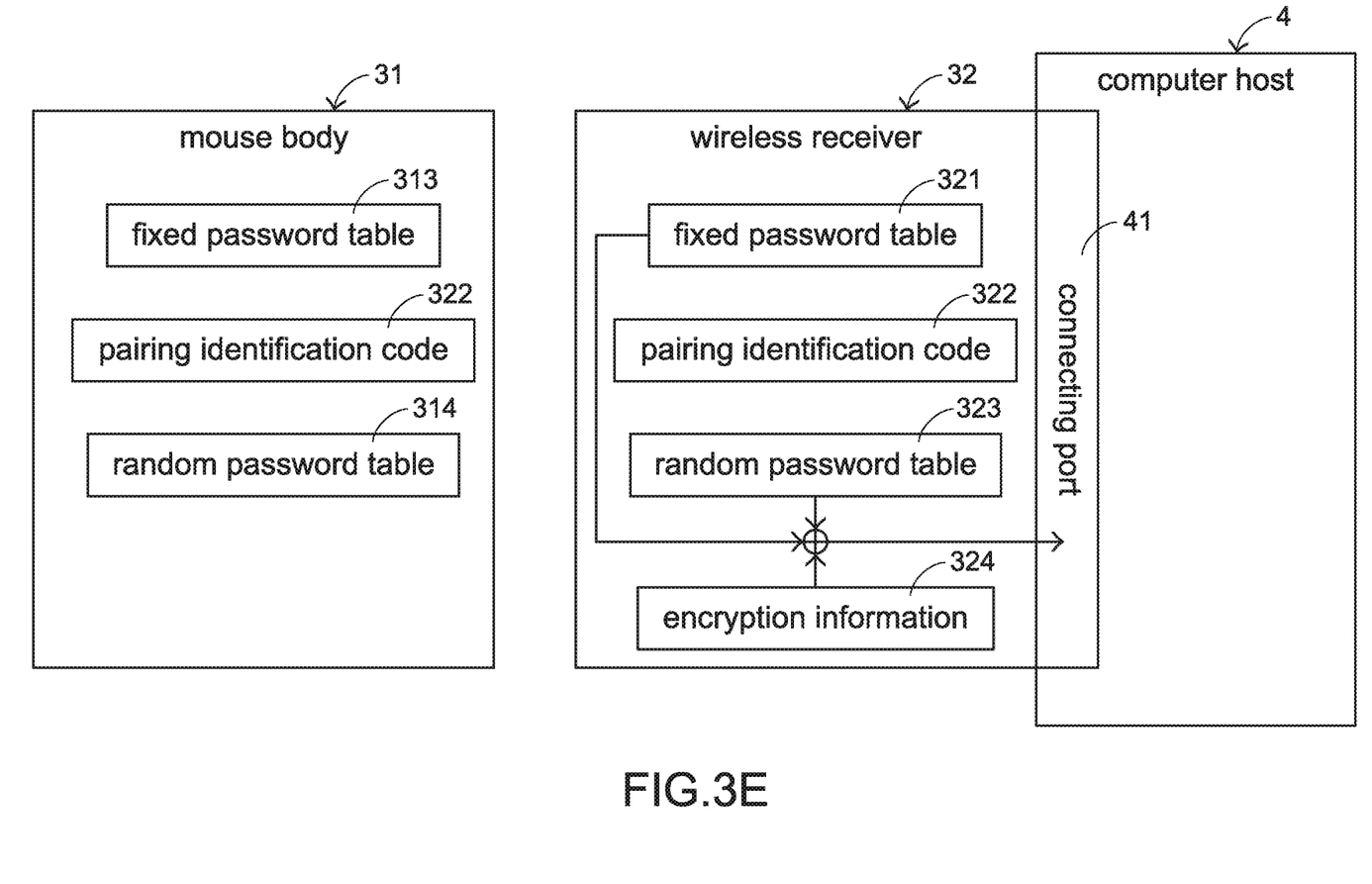
FIG. 3E schematically illustrate the operations of the wireless mouse and the computer host as shown in FIG. 2.

Please refer to FIG. 3D. When the mouse body 31 is held by the user's palm and operated by the user, the original information 315 for controlling the computer host 4 in the subsequent procedure is generated by the mouse body 31 according to the user's operation. Then, the original information 315 is converted into an encryption information 324 according to the fixed password table 313 and the random password table 314, and the encryption information 324 is transmitted to the wireless receiver 32 (see FIG. 3E). Preferably, the encryption information 324 contains the encrypted original information 315 and a cyclic redundancy check (CRC) code.

Figure 3F:
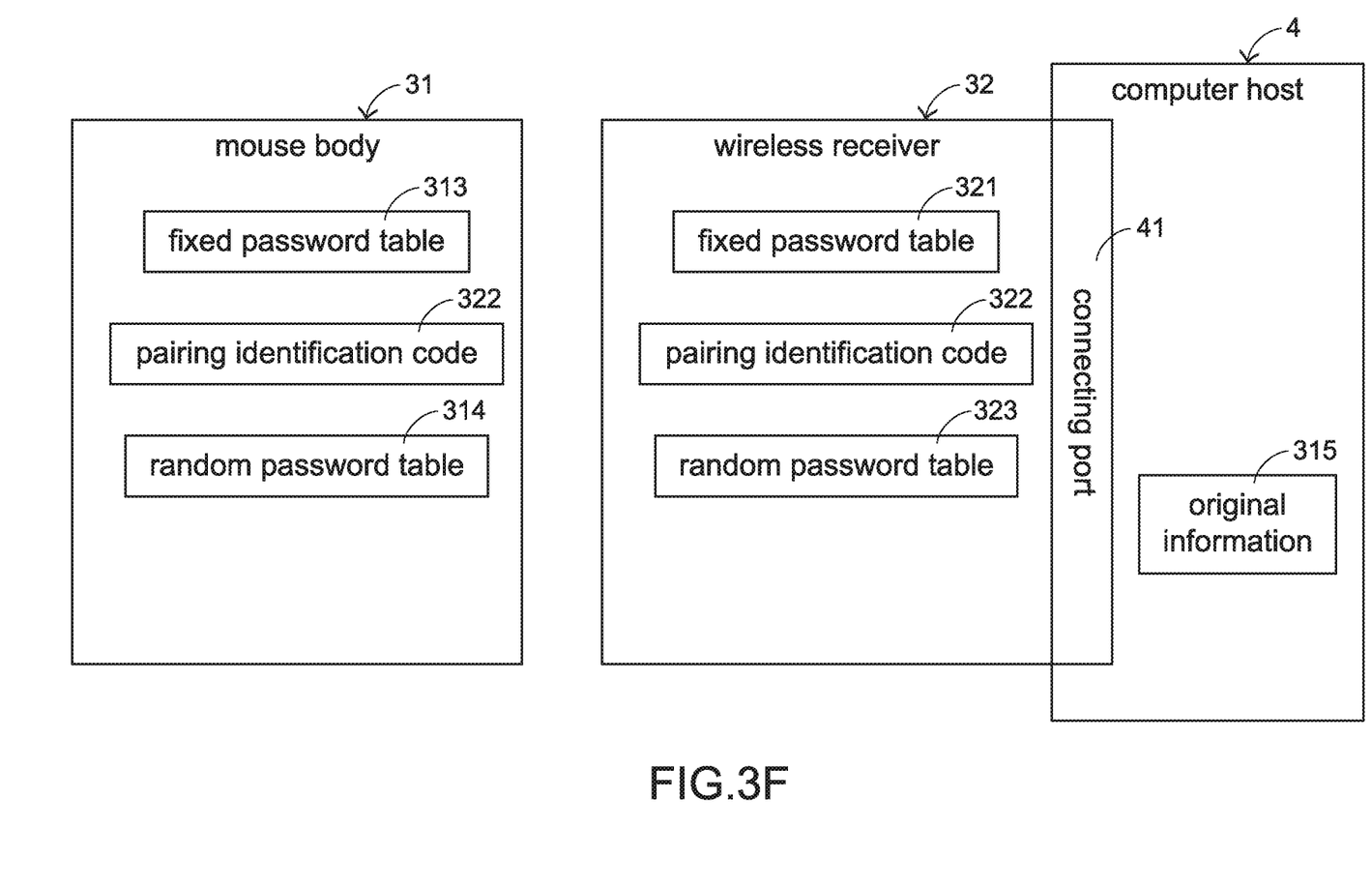
FIG. 3F schematically illustrate the operations of the wireless mouse and the computer host as shown in FIG. 2.

After the wireless receiver 32 receives the encryption information 324 from the mouse body 31, the encryption information 324 is decrypted by the wireless receiver 32 according to the CRC code of the encryption information 324 and the fixed password table 321 and the random password table 323 of the wireless receiver 32. Consequently, the encryption information 324 is restored to the original information 315 (see FIGS. 3E and 3F). Then, as shown in FIG. 3F, the computer host 4 receives the original information 315 through the wireless receiver 32. According to the original information 315, the computer host 4 performs the corresponding operation.

The encryption technology and the decryption technology associated with the CRC code are well known to those skilled in the art, and are not redundantly described herein.

Figure 4:
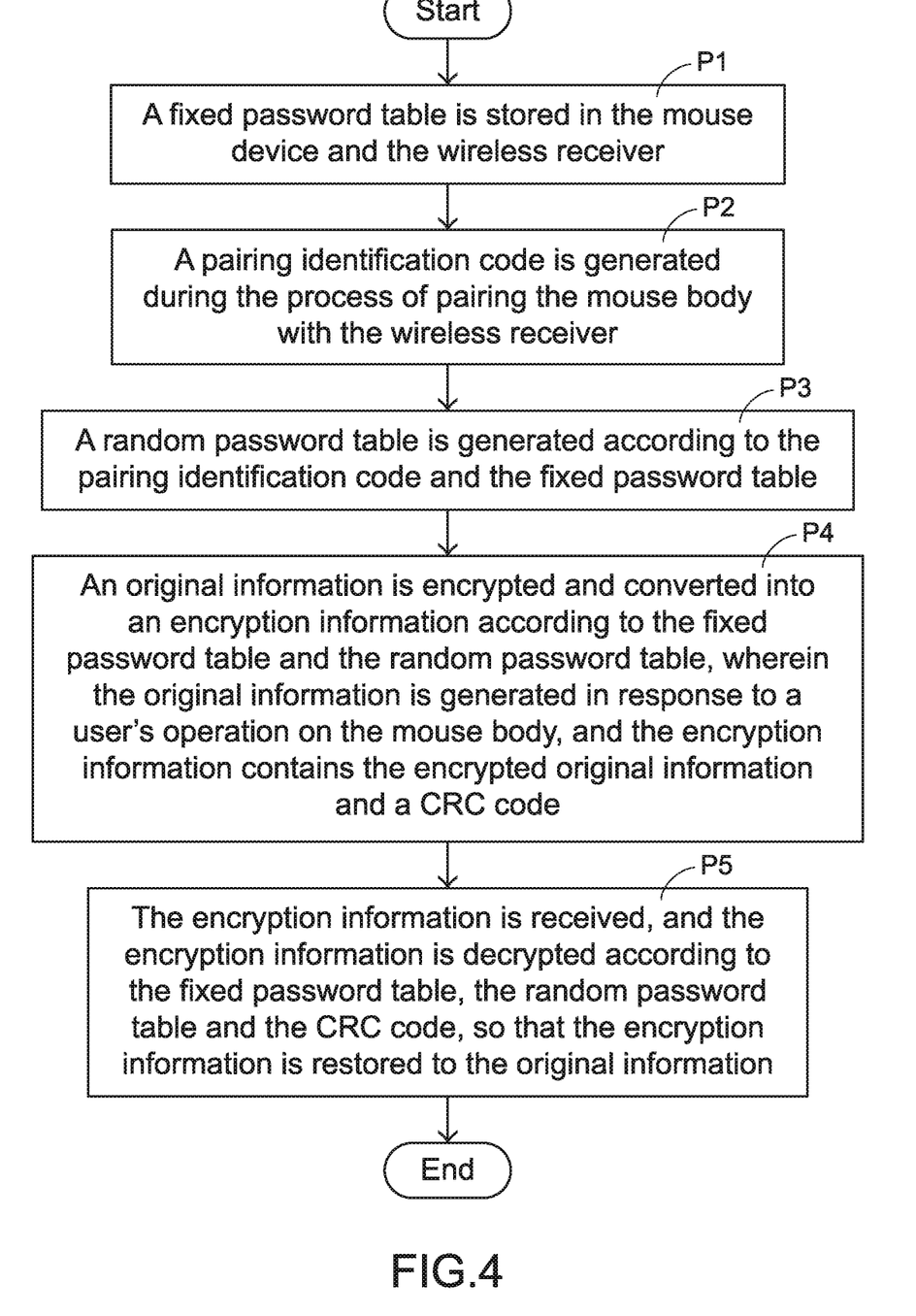
FIG. 4 is a flowchart illustrating an information transmission method according to an embodiment of the present invention.

FIG. 4 is a flowchart illustrating an information transmission method according to an embodiment of the present invention. The information transmission method comprises the following steps.

In a step P1, a fixed password table 313 (or 321) is stored in the mouse device 31 and the wireless receiver 32.

In a step P2, a pairing identification code 322 is generated during the process of pairing the mouse body 31 with the wireless receiver 32.

In a step P3, a random password table 314 (or 323) is generated according to the pairing identification code 322 and the fixed password table 313 (or 321).

In a step P4, an original information 315 is encrypted and converted into an encryption information 324 according to the fixed password table 313 and the random password table 314. The original information 315 is generated in response to a user's operation on the mouse body 31. The encryption information 324 contains the encrypted original information 315 and a cyclic redundancy check (CRC) code.

In a step P5, the encryption information 324 is received, and the encryption information 324 is decrypted according to the fixed password table 321, the random password table 323 and the CRC code, so that the encryption information 324 is restored to the original information 315.

From the above descriptions, the present invention provides the wireless mouse and the data transmission method for the wireless mouse. When the mouse body is held by the user's palm and the mouse body is operated by the user, the information to be transmitted to the wireless receiver is encrypted by the mouse body. During the process of communicating the mouse body with the wireless receiver, the information is not monitored and cracked by a person with bad intentions. Consequently, the security of protecting the information between the mouse body and the wireless receiver is enhanced. In other words, the wireless mouse and the data transmission method of the present invention are industrially valuable.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all modifications and similar structures.

What is claimed is:

1. A wireless mouse, comprising:
   a mouse body, wherein when the mouse body is operated by a user, an original information is generated, wherein the original information is encrypted and converted into an encryption information by the mouse body; and
   a wireless receiver connected with a computer host, and receiving the encryption information from the mouse body, wherein after the encryption information is received by the wireless receiver, the encryption information is decrypted by the wireless receiver, so that the encryption information is restored into the original information, wherein after the computer host receives the original information through the wireless receiver, the computer host performs a corresponding operation,
   wherein a fixed password table is stored in the mouse body,
   wherein the wireless receiver is configured to generate a pairing identification code and transmit the pairing identification code to the mouse body during a process of pairing the wireless receiver with the mouse body,
   wherein the mouse body is configured to generate a random password table according to the fixed password table in the mouse body and the pairing identification code,
   wherein the original information is encrypted and converted into the encryption information by the mouse body according to the fixed password table in the mouse body and the random password table generated by the mouse body.

2. The wireless mouse according to claim 1, wherein the encryption information contains the encrypted original information and a cyclic redundancy check code.

3. The wireless mouse according to claim 2, wherein a fixed password table is stored in the wireless receiver, and the wireless receiver is configured to generate a random password table according to the fixed password table in the wireless receiver and the pairing identification code, wherein after the encryption information is received by the wireless receiver, the encryption information is decrypted by the wireless receiver according to the fixed password table in the wireless receiver, the random password table generated by the wireless receiver and the cyclic redundancy check code, so that the encryption information is restored to the original information.

4. The wireless mouse according to claim 1, wherein the mouse body and the wireless receiver are in communication with each other according to a 2.4G wireless radio frequency transmission technology.

5. The wireless mouse according to claim 1, wherein the computer host comprises a universal serial bus (USB) connecting port, and the wireless receiver is a USB dongle that is plugged into the USB connecting port.

6. A data transmission method for a wireless mouse, the wireless mouse comprising a mouse body and a wireless receiver, the mouse body being operable by a user, the wireless receiver being connected with a computer host, the data transmission method comprising steps of:
   (a) storing a fixed password table in the mouse body and a fixed password table in the wireless receiver;
   (b) generating a pairing identification code during a process of pairing the mouse body with the wireless receiver;
   (c) generating a random password table by the mouse body according to the pairing identification code and the fixed password table in the mouse body, and generating a random password table in the wireless receiver;
   (d) encrypting an original information according to the fixed password table in the mouse body and the random password table generated by the mouse body, so that the original information is converted into an encryption information, wherein when the mouse body is operated by the user, the original information is generated, wherein the encryption information contains the encrypted original information and a cyclic redundancy check code; and
   (e) receiving the encryption information, and decrypting the encryption information according to the fixed password table in the wireless receiver, the random password table generated by the wireless receiver and the cyclic redundancy check code, so that the encryption information is restored to the original information.

7. The wireless mouse according to claim 6, wherein after the computer host receives the restored original information through the wireless receiver, the computer host performs a corresponding operation.

8. The data transmission method according to claim 7, wherein the mouse body and the wireless receiver are in communication with each other according to a 2.4G wireless radio frequency transmission technology.

* * * * *